United States Patent
Carter et al.

(10) Patent No.: US 9,556,369 B2
(45) Date of Patent: *Jan. 31, 2017

(54) ADHESIVE DERIVED FROM DIMERIC FATTY ACID OR DIMERIC FATTY DIOL

(71) Applicant: Croda International PLC, Goole, East Yorkshire (GB)

(72) Inventors: Jeffrey Thomas Carter, Cleveland (GB); Renee van Schijndel, Gouda (NL)

(73) Assignee: CRODA INTERNATIONAL PLC, East Yorkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,318

(22) Filed: Mar. 11, 2013

(65) Prior Publication Data

US 2013/0296484 A1 Nov. 7, 2013

Related U.S. Application Data

(63) Continuation of application No. 10/540,154, filed as application No. PCT/GB03/05623 on Dec. 22, 2003, now Pat. No. 8,454,793.

(30) Foreign Application Priority Data

Dec. 23, 2002 (GB) .................................. 0229844.6

(51) Int. Cl.
  *C09J 175/00* (2006.01)
  *C09J 175/06* (2006.01)
  *C08G 18/42* (2006.01)

(52) U.S. Cl.
  CPC .......... *C09J 175/06* (2013.01); *C08G 18/4233* (2013.01)

(58) Field of Classification Search
  CPC ........................ C09J 175/06; C08G 18/4233
  USPC ..... 156/331.4, 331.1, 331.7; 528/75, 83, 84, 528/85
  See application file for complete search history.

(56) References Cited

U.S. PATENT DOCUMENTS

| | | | |
|---|---|---|---|
| 3,264,236 A | | 8/1966 | Santaniello |
| 3,406,134 A | * | 10/1968 | Seiwert et al. .................. 528/75 |
| 3,505,250 A | | 4/1970 | Saunders |
| 3,897,581 A | * | 7/1975 | Nakatsuka et al. ............. 428/44 |
| 4,395,530 A | | 7/1983 | Hammond |
| 4,602,079 A | * | 7/1986 | Vinches et al. .................. 528/60 |
| 4,752,637 A | | 6/1988 | Israel |
| 4,808,255 A | * | 2/1989 | Markevka et al. ........ 156/307.3 |
| 4,933,232 A | | 6/1990 | Trout et al. |
| 4,985,535 A | | 1/1991 | Takada et al. |
| 5,015,321 A | * | 5/1991 | Jansen et al. .............. 156/331.7 |
| 5,176,956 A | | 1/1993 | Jevne et al. |
| 5,234,996 A | | 8/1993 | Mori et al. |
| 5,965,662 A | | 10/1999 | Krebs et al. |
| 5,994,493 A | | 11/1999 | Krebs |
| 6,355,317 B1 | | 3/2002 | Reid et al. |
| 6,610,811 B1 | | 8/2003 | Westfechtel et al. |
| 6,803,412 B2 | | 10/2004 | Nguyen-Misra et al. |

FOREIGN PATENT DOCUMENTS

| | | |
|---|---|---|
| EP | 0289945 | 11/1988 |
| EP | 0390537 | 10/1990 |
| EP | 0488560 | 6/1992 |
| JP | 2003-013032 | 1/2003 |
| WO | WO 93/24551 | 12/1993 |
| WO | WO 01/25307 | 4/2001 |
| WO | WO 02/092662 | 11/2002 |

OTHER PUBLICATIONS

International Search Report dated Apr. 13, 2004 for PCT/GB2003/005623.

Examination Report dated Jul. 14, 2011 for corresponding European Application No. 03786148.1.

M. Dollhausen: "Polyurethan-Klebstoffe"; In: G. Becker, D. Braun: "Kunstoff-Handbuch, Tiel 7—Polyurethane", 1983, Carl Hanser Verlag, Muenchen, pp. 583-587. [with English Translation provided].

Office Action mailed Oct. 7, 2013 in corresponding European Patent Application No. 03786148.1.

* cited by examiner

*Primary Examiner* — Michael L Leonard

(74) *Attorney, Agent, or Firm* — Ratnerprestia

(57) ABSTRACT

An adhesive containing polyisocyanate and a polyol containing at least one dimer fatty acid and/or dimer fatty diol. The adhesive is particularly suitable for use on wood.

23 Claims, No Drawings

ADHESIVE DERIVED FROM DIMERIC FATTY ACID OR DIMERIC FATTY DIOL

CROSS REFERENCE TO RELATED APPLICATIONS

This application is a continuation of U.S. application Ser. No. 10/540,154, filed Jan. 12, 2006, which is further the National Phase of International Application No. PCT/GB2003/005623, filed Dec. 22, 2003, which designated the United States and was published in English. The foregoing applications, in their entirety, are incorporated herein by reference.

FIELD OF INVENTION

The present invention relates to an adhesive comprising an isocyanate, and in particular to the use thereof as a wood adhesive.

BACKGROUND

Adhesives have been used in the wood industry for many years. Uses include the lumber industry, the aggregated fibre board industry, the medium density fibreboard (MDF) market, and the oriented strand board (OSB) market. The chemical composition of wood adhesives varies greatly, but the most widely used adhesives are based upon phenol formaldehyde, urea formaldehyde, urea-melamine formaldehyde, and isocyanate such as polymeric diphenyl methane diisocyanate (pMDI).

pMDI adhesives, in particular, are popular in the USA. pMDI adhesives are normally formed by reacting diphenyl methane diisocyanate with a polyether polyol such as polypropylene glycol. One of the advantages of pMDI adhesives is that the cure mechanism relies upon the moisture content of the wood reacting with free NCO groups in the adhesive to form polyurea, which differs from the other major adhesives in that for most applications heat and pressure is not required to develop a mechanically acceptable joint. However, one of the limiting factors which prevents greater use of pMDI adhesives, when compared, for example to phenol formaldehyde based resins, is their performance under wet conditions. An improvement in the hydrolytic stability of pMDI based adhesives, whilst at least maintaining the adhesive property, is required to significantly increase the use thereof.

SUMMARY OF THE INVENTION

We have now surprisingly discovered an isocyanate based adhesive which reduces or substantially overcomes at least one of the aforementioned problems, Accordingly, the present invention provides an adhesive comprising polyisocyanate and a polyol comprising at least one dimer fatty acid and/or dimer fatty diol.

The invention also provides a substrate coated with an adhesive comprising polyisocyanate and a polyol comprising at least one dimer fatty acid and/or dimer fatty diol.

The invention further provides the use of an adhesive comprising polyisocyanate and a polyol comprising at least one dimer fatty acid and/or dimer fatty diol, to adhere wood.

The invention still further provides wooden joists, wooden frames and/or external wooden cladding adhered together using an adhesive comprising polyisocyanate and a polyol comprising at least one dimer fatty acid and/or dimer fatty diol.

The adhesive is preferably formed from, i.e. comprises the reaction product of at least one polyisocyanate. The polyisocyanate component is preferably at least one isocyanate which has a functionality of at least 2, and may be an aliphatic or aromatic isocyanate.

An aliphatic isocyanate such as hexamethylene 1,6-diisocyanate may be employed, but an aromatic isocyanate is preferred such as tolylene diisocyanate, m-phenylene diisocyanate, p-phenylene diisocyanate, xylylene diisocyanate, 4,4'-diphenyl methane diisocyanate, 2,4'-diphenyl methane diisocyanate, 2,2'-diphenyl methane diisocyanate, hexamethylene diisocyanate, isophorone diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as uretonimine-modified compounds thereof. The polyisocyanate monomers can be used alone or as mixtures thereof. In a preferred embodiment, diphenyl methane diisocyanate (MDI) is used, more preferably 2,4'-diphenyl methane diisocyanate. In a particularly preferred embodiment, 2,4'-diphenyl methane diisocyanate is used as a mixture with 4,4'-diphenyl methane diisocyanate, preferably at a ratio by weight of 0.5 to 2:1, more preferably 0.8 to 1.2:1, and particularly approximately 1:1.

The polyisocyanate preferably has a viscosity at 25° C. (measured as described herein) in the range from 1 to 500, more preferably 50 to 400, particularly 100 to 300, and especially 150 to 250 mPa·s.

The adhesive is preferably formed from, i.e. comprises the reaction product of, at least one polyol. The polyol may comprise polyol, triol, or diol, and preferably diol. The polyol preferably comprises and/or is formed from, i.e. comprises the reaction product of, at least one dimer fatty acid and/or dimer fatty diol and/or equivalent thereof.

The term dimer fatty acid is well known in the art and refers to the dimerisation product of mono- or polyunsaturated fatty acids and/or esters thereof. Preferred dimer fatty acids are dimers of $C_{10}$ to $C_{30}$, more preferably $C_{12}$ to $C_{24}$, particularly $C_{14}$ to $C_{22}$, and especially $C_{18}$ alkyl chains. Suitable dimer fatty acids include the dimerisation products of oleic acid, linoleic acid, linolenic acid, palmitoleic acid, and elaidic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used. Hydrogenated, for example by using a nickel catalyst, dimer fatty acids may also be employed.

In addition to the dimer fatty acids, dimerisation usually results in varying amounts of oligomeric fatty acids (so-called "trimer") and residues of monomeric fatty acids (so-called "monomer"), or esters thereof, being present. The amount of monomer can, for example, be reduced by distillation. Particularly preferred dimer fatty acids, used in the present invention, have a dicarboxylic (or dimer) content of greater than 45%, more preferably greater than 60%, particularly greater than 70%, and especially greater than 75% by weight. The trimer content is preferably less than 55%, more preferably in the range from 5 to 40%, particularly 10 to 30%, and especially 15 to 25% by weight. The monomer content is preferably less than 10%, more preferably in the range from 0.5 to 5%, particularly 1 to 4%, and especially 2 to 3% by weight.

Dimer fatty diols can be produced by hydrogenation of the corresponding dimer fatty acid. The same preferences above for the dimer fatty acid apply to the corresponding dimer fatty diol component of the polyol.

The polyol component of the adhesive preferably comprises an oligomer or polymer (hereinafter referred to as a polymer) formed from, i.e. comprises the reaction product of, at least one dimer fatty acid and/or dimer fatty diol and/or equivalent thereof. Suitable polymers are polyesters, including homopolymers, and random or block co- and ter-polymers thereof. The optional non-ester component includes amides and urethanes. Polyesteramides are preferred copolymers. Alternatively blends, preferably of polyester and polyamide and/or polyurethane, may be employed.

The molecular weight (number average) of the polyol is preferably in the range from 500 to 5,000, more preferably 600 to 4,000, particularly 700 to 3,000, and especially 800 to 2,000.

In a preferred embodiment of the present invention, the polyol comprises an oligoester or polyester (hereinafter referred to as a polyester). Polyester is normally produced in a condensation reaction between at least one polycarboxylic acid and at least one polyol. Dicarboxylic acids and diols are preferred. The preferred dicarboxylic acid component of the polyester used in the present invention comprises at least one dimer fatty acid, as described above.

The dicarboxylic acid component of the polyester may also comprise non-dimeric fatty acids. The non-dimeric fatty acids may be aliphatic or aromatic, and include dicarboxylic acids and the esters, preferably alkyl esters, thereof, preferably linear dicarboxylic acids having terminal carboxyl groups having a carbon chain in the range from 2 to 20, more preferably 6 to 12 carbon atoms, such as adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid and higher homologs thereof. Adipic acid is a particularly preferred non-dimeric fatty acid.

A monomeric dicarboxylic acid anhydride, such as phthalic anhydride, may also be employed as the or as part of the non-dimeric fatty acid component.

The polyester is preferably formed from dimer fatty acids to non-dimer fatty acids present at a ratio in the range from 60 to 100%:0 to 40%, more preferably 70 to 100%:0 to 30%, particularly 80 to 100%:0 to 20%, and especially 90 to 100%:0 to 10% by weight of the total dicarboxylic acids. In a particularly preferred embodiment of the present invention the dicarboxylic acid component of the polyester is substantially all dimer fatty acid.

The polyol component of the polyester is suitably of low molecular weight, preferably in the range from 50 to 650, more preferably 60 to 150, and particularly 60 to 100. The polyol component may comprise polyols such as pentaerythritol, triols such as glycerol and trimethylolpropane, and preferably diols. Suitable diols include straight chain aliphatic diols such as ethylene glycol, diethylene glycol, 1,3-propylene glycol, dipropylene glycol, 1,4-butylene glycol, 1,6-hexylene glycol, branched diols such as neopentyl glycol, 3-methyl pentane glycol, 1,2-propylene glycol, and cyclic diols such as 1,4-bis(hydroxymethyl)cyclohexane and (1,4-cyclohexane-dimethanol). Ethylene glycol and propylene glycol are preferred diols.

The polyol component of the polyester may also comprise a dimer fatty diol as described above. The same preferences above for the dimer fatty acid apply to the corresponding dimer fatty diol component of the polyester.

The polyester preferably comprises the reaction residues of diol and dicarboxylic acid present at a molar ratio in the range from 1 to 5:1, more preferably 1.1 to 3:1, particularly 1.15 to 2:1, and especially 1.2 to 1.5:1. The diol is preferably present in sufficient molar excess that the polyester is terminated at both ends with hydroxyl groups.

In a preferred embodiment, the polyester is formed from dimer fatty acid and at least one diol selected from ethylene glycol and propylene glycol.

The polyester preferably comprises on average in the range from 1 to 5, more preferably 1.5 to 4, particularly 2 to 3.5, and especially 2.5 to 3 ester bonds.

The polyester preferably has a molecular weight (number average) in the range from 750 to 4,000, more preferably 800 to 2,500, particularly 850 to 1,500, and especially 900 to 1,200.

The polyester preferably has a glass transition temperature (Tg) in the range from −55 to 0° C., more preferably −50 to −20° C., particularly −45 to −25° C., and especially -40 to −30° C.

The polyester preferably has a hydroxyl value (measured as described herein) in the range from 40 to 220, more preferably 52 to 150, particularly 75 to 140, and especially 100 to 125 mgKOH/g. In addition, the polyester preferably an acid value (measured as described herein) of less than 1, more preferably less than 0.5, and particularly less than 0.3 mgKOH/g.

The polyester preferably has a viscosity at 25° C. (measured as described herein) in the range from 600 to 2,000, more preferably 700 to 1,500, particularly 750 to 1,200, and especially 800 to 1,000 mPa·s.

The polyol, preferably polyester, preferably comprises in the range from 10 to 100%, more preferably 25 to 75%, particularly 35 to 60%, and especially 40 to 50% by weight of reaction residues of dimer fatty acid and/or dimer fatty diol and/or equivalent thereof.

In one embodiment of the invention, at least one of the aforementioned polyisocyanates is reacted with at least one of the aforementioned polyesters, to form an adhesive resin.

The ratio of polyisocyanate to polyester starting materials which are mixed together to react to form the adhesive is preferably in the range from 20 to 80%:20 to 80%, more preferably 35 to 75%:25 to 65%, particularly 50 to 70%:30 to 50%, and especially 60 to 70%:30 to 40% by weight. The polyisocyanate is preferably used in molar excess relative to OH group content of the polyester, so as to obtain an adhesive composition comprising an isocyanate-terminated polyester and unreacted isocyanate.

The NCO:OH molar ratio of the mixture of the polyisocyanate and polyester starting materials is preferably in the range from 1.1 to 16:1, more preferably 2 to 14:1, particularly 3 to 12:1, and especially 6 to 10:1.

A catalyst may be, and preferably is, employed in the reaction to produce an adhesive according to the present invention. Examples of suitable urethane catalysts include tertiary amines such as triethylamine, 1,4-diazabicyclo [2.2.2.]octane (DABCO), N-methylmorpholine, N-ethylmorpholine, N,N,N',N'-tetramethylhexamethylenediamine, 1,2-dimethylimidazol; and tin compounds such as tin(II) acetate, tin(II)octanoate, tin(II)laurate, dibutyltin dilaurate, dibutyltin dimaleate, dioctyltin diacetate and dibutyltin dichloride. The catalyst may be used alone or as mixtures thereof.

The adhesive preferably has a molecular weight (number average) in the range from 600 to 2,000, more preferably 650 to 1,500, particularly 700 to 1,000, and especially 750 to 850. The molecular weight of the adhesive composition is relatively low due to the presence of significant residual amounts of unreacted polyisocyanate which reduces the average molecular weight thereof.

The adhesive is preferably formed from, i.e. comprises the reaction product of, on average in the range from 1 to 6, more preferably 2 to 5, particularly 2.5 to 4.5, and especially 3 to 4 polyisocyanate monomers, and also blocks of polymer, preferably polyester.

The adhesive preferably has an isocyanate content (measured as described herein) in the range from 10 to 40%, more preferably 12 to 30%, particularly 14 to 25%, and especially 16 to 20% NCO.

The adhesive preferably comprises in the range from 2 to 60%, more preferably 8 to 40%, particularly 14 to 30%, and especially 16 to 20% by weight of reaction residues of dimer fatty acid and/or dimer fatty diol and/or equivalent thereof.

The adhesive preferably has a viscosity at 23° C. (measured as described herein) in the range from 2 to 40, more preferably 3 to 30, particularly 4 to 20, and especially 5 to 10 Pa.s.

The adhesive may also comprise other optional components such as fillers, for example nylon, glass fibre, fumed silica, wood flour; and other agents such as pigments, antioxidants, stabilizers, flow additives etc.

The adhesive is preferably applied to a suitable substrate, preferably wood, in situ as a free flowing viscous solid, and cured, by reacting with water present in the substrate, at ambient temperature.

A particularly surprising feature of the adhesive according to the present invention is increased penetration thereof into wood compared to prior art adhesives, which can result in improved adhesive properties.

The cured adhesive preferably has a lap shear adhesion value (measured as described herein) of greater than 6, more preferably greater than 8, particularly greater than 10, and especially greater than 12 MPa.

The cured adhesive preferably has a creep rupture adhesion value in air at ambient temperature (23° C.) (measured as described herein) at a stress value of 8 MPa and/or 6 MPa and/or 4 MPa of greater than 500,000, and more preferably greater than 1,000,000 seconds.

The cured adhesive suitably has a creep rupture adhesion value in water at ambient temperature (23° C.), and more suitably in water at elevated temperature (90° C.) (measured as described herein) (i) at a stress value of 8 MPa of greater than 50, preferably greater than 100, more preferably greater than 500, particularly greater than 1,000, and especially greater than 1,500 seconds, and/or (ii) at a stress value of 6 MPa of greater than 150, preferably greater than 500, more preferably greater than 2,500, particularly greater than 10,000, and especially greater than 15,000 seconds, and/or (iii) at a stress value of 4 MPa of greater than 2,000, preferably greater than 10,000, more preferably greater than 100,000, particularly greater than 500,000, and especially greater than 1,000,000 seconds.

A particular surprising feature of an adhesive according to the present invention is that the adhesion values are effectively maintained under hot moist conditions. Thus, the time to failure of the adhesive in the creep rupture adhesion test described herein at 90° C. in water at a stress value of 4 MPa, preferably 6 MPa, and more preferably 8 MPa, is preferably at least 50%, more preferably at least 70%, particularly at least 90%, and especially 100% or greater of the value obtained when tested at 23° C. in air.

The adhesive described herein is suitable for use on wood, including soft, hard and tropical woods. Particularly preferred woods include yellow birch, ponderosa pine, and especially tropical hard woods such bengkirai (or balau).

The adhesive is particularly suitable for external use. The adhesive can be used, for example, in wooden joists, wooden frames and external wooden cladding.

The adhesive may also be used on materials other than wood, for example on textiles, plastics, and metals such as steel, copper and aluminium. Suitable applications include panel lamination, automotive, furniture and general assembly.

In this specification the following test methods have been employed:

(i) Molecular weight number average was determined by Gel Permeation Chromatography (GPC).

(ii) The softening point and glass transition temperature (Tg) were measured by Differential Scanning calorimetry (DSC) at a scan rate of 20° C./minute using a Mettler DSC30.

(iii) The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

(iv) The acid value is defined as the number of mg of potassium hydroxide required to neutralise the free fatty acids in 1 g of sample, and was measured by direct titration with a standard potassium hydroxide solution.

(v) (a) Viscosity of the polyisocyanate and polyester were measured 25° C. using a Brookfield Reometer.

(b) Viscosity of the adhesive was measured using a Rheometrics rheometer. A sample of the adhesive was placed between two spherical platens of 12.5 cm diameter. A frequency of 10 radians per second was used as well as a 10% strain. The Complex Viscosity (Eta*) was measured at ambient temperature (23° C.).

(vi) Lap shear adhesion was measured using yellow birch (US hardwood). The wood was conditioned in a temperature/humidity controlled oven to have a moisture content of 12 weight % at 23° C. This was measured using a dedicated wood moisture meter (mini-Ligno XL moisture meter) calibrated for yellow birch. The lap shear specimen comprised 2 halves (25 mm×160 mm×4 mm). The 2 halves were stuck together to form a lapped joint which overlapped by 25 mm. The adhesive was applied and a joint of adhesive thickness of less than 0.5 mm was achieved. These test specimens were clamped together to protect the joint, and left to cure in a controlled laboratory atmosphere of 23° C. and 50% relative humidity. The adhesive joints were then tested to destruction for specimens cured for 7 days after preparation. The wood grain was oriented in the tensile direction. The Lap shear tests were carried out according to ASTM D-1002/99 lap-shear adhesion test.

(vii) Creep rupture adhesion was measured using yellow birch. Samples were prepared by matching the wood samples to comprise 2 halves (40 mm×20 mm×4 mm). The wood was oriented so that the wood grain was in the stress direction. These samples were further machined using a finger jointing tool (as described in ASTM D5572). These finger joints were made with a 5 mm interlocking section. This type of joint provides some stability during manufacture of the adhesive joint, and gives a larger area of adhesive exposed to the aggressive conditions of the test. The resultant sample was 75 mm×20 mm×4 mm. The creep rupture tests were carried out using a lever loaded creep rupture apparatus. The above samples were clamped into tensile grips and a weight applied. This arrangement was used to tension the sample, and the general principle applied whereby the sample was loaded and the time taken for the specimen to fail was recorded electronically from time switches. This approach was used when testing at ambient (23° C.), or elevated temperature (90° C.), in air or water environments. The methodology is that initially a large tensile force was applied, which gives an instant failure. The force was then reduced by an agreed increment, and the time to failure was increased. This principle was applied until the time to failure increased until failures were not seen over a 6 week timespan. This data was then plotted as a stress versus log time to failure plot. The time for failure in seconds at stress values of 8, 6, and 4 MPa were then read off the graph.

The invention is illustrated by the following non-limiting examples.

Example 1

(i) Synthesis of Polyol 2210 g of "Pripol" 1017 ((trade mark) dimer acid, C36 dicarboxylic (ex Uniqema)) and 957 g ethylene glycol were reacted in a 4 litre standard distillation unit including separation column at approximately 190° C. for 5.9 hours at atmospheric pressure. The heating time was 3.9 hours, and the maximum temperature of the distillation column was 105° C. After a reaction time of 0.3 hour, 0.26 ml of 0.01 weight % solution of tetra butyl titanate was added. When the reaction mixture reached an acid value of 0.36 mg KOH/g, the excess ethylene glycol was distilled off at a maximum distillation column temperature of 150° C., and a minimum pressure of 2.3 mbar. The resultant oligoester was obtained by filtering at 85° C., and exhibited the following properties, measured as described herein.

(i) The hydroxyl value was 117 mgKOH/g.
(ii) The acid value was 0.28 mgKOH/g.

(i) Synthesis of Adhesive 100 g of the oligoester produced above was placed into a 500 ml round bottomed flask fitted with a mechanical stirrer, nitrogen inlet, thermocouple, dropping funnel and vacuum take-off line. The oligoester was heated to 120° C. and a vacuum was applied down to 25 mbar, to remove any water from the oligoester. The vacuum was held for 1 hour, and then released by allowing nitrogen into the reactor. The reaction was then cooled to 80° C. and 174 g of liquid VKS20 (MDI (ex Bayer)) was added over a period of 10 minutes from a dropping funnel. The dropping funnel was removed and replaced with a drying tube. The reaction then continued for 2 hours at 80° C., after which time the resin was poured into two glass bottles, flushed with dry nitrogen and sealed. The resulting adhesive had the following properties, measured as described herein;

(i) Lap shear adhesion value was 8 MPa.
(ii) Creep rupture adhesion value at 23° C. in air was >1,000,000 seconds at a stress of 8 MPa.
(iii) Creep rupture adhesion value in water at 90° C. was;
a) 2700 seconds at a stress of 8 MPa,
b) 15,350 seconds at a stress of 6 MPa, and
c) >1,000,000 seconds at a stress of 4 MPa.

Example 2

This is a comparative example not according to the present invention. The procedure of Example 1 was repeated except that 100 g of polypropylene glycol of molecular weight number average 1000 was used as the polyol instead of the oligoester, and reacted with 158.2 g of VKS20. The resulting adhesive had the following properties, measured as described herein;

(i) Lap shear adhesion value was 7 MPa.
(ii) Creep rupture adhesion value at 23° C. in air was >1,000,000 seconds at a stress of 8 MPa.
(iii) Creep rupture adhesion value at 90° C. in water was;
a) 30 seconds at a stress of 8 MPa,
b) 135 seconds at a stress of 6 MPa, and
c) 1920 seconds at a stress of 4 MPa.

The above examples illustrate the improved properties of an adhesive according to the present invention.

The invention claimed is:

1. A moisture-curable adhesive, comprising a reaction product of:
   1) at least one polyisocyanate; and
   2) at least one polyester having a number average molecular weight in the range from 500 to 5,000, wherein the at least one polyester is formed from:
      a) a carboxylic acid component, comprising:
         i) 60 to 100% by weight of dimer fatty acids, relative to the weight of the total weight of dicarboxylic acids; and
         ii) 0 to 40% by weight of non-dimer fatty acids, relative to the weight of the total weight of dicarboxylic acids, wherein the non-dimer fatty acids are aliphatic dicarboxylic acids having terminal carboxyl groups and a 2 to 20 carbon chain; and
      b) a polyol component;
   wherein:
      i) the adhesive comprises an isocyanate content in the range from 11 to 40 wt. %, relative to the weight of the adhesive; and
      ii) the adhesive, after curing, comprises a creep rupture adhesion value at a stress value of 8 MPa of greater than 1,000 seconds in water at 90° C.

2. The moisture-curable adhesive of claim 1, wherein the adhesive, after curing, comprises a lap shear adhesion value of greater than 8 MPa.

3. The moisture-curable adhesive of claim 1, wherein the adhesive, after curing, comprises a lap shear adhesion value of greater than 10 MPa.

4. The moisture-curable adhesive of claim 1, wherein the adhesive, after curing, comprises a lap shear adhesion value of greater than 12 MPa.

5. The moisture-curable adhesive of claim 1, wherein the adhesive, after curing, comprises a creep rupture adhesion value at a stress value of 8 MPa of greater than 1,000,000 seconds in air at 23° C.

6. The moisture-curable adhesive of claim 1, wherein the adhesive, after curing, comprises a creep rupture adhesion value at a stress value of 6 MPa of greater than 500,000 seconds in air at 23° C.

7. The moisture-curable adhesive of claim 1, wherein the adhesive, after curing, comprises a creep rupture adhesion value at a stress value of 4 MPa of greater than 500,000 seconds in air at 23° C.

8. The moisture-curable adhesive of claim 1, wherein the adhesive, after curing, comprises a creep rupture adhesion value at a stress value of 8 MPa of greater than 1,500 seconds in water at 23° C.

9. The moisture-curable adhesive of claim 1, wherein the adhesive, after curing, comprises a creep rupture adhesion value at a stress value of 8 MPa of greater than 1,500 seconds in water at 90° C.

10. The moisture-curable adhesive of claim 1, wherein the adhesive, after curing, comprises a creep rupture adhesion value at a stress value of 6 MPa of greater than 500 seconds in water at 90° C.

11. The moisture-curable adhesive of claim 1, wherein the adhesive, after curing, comprises a creep rupture adhesion value at a stress value of 6 MPa of greater than 10,000 seconds in water at 90° C.

12. The moisture-curable adhesive of claim 1, wherein the adhesive, after curing, comprises a creep rupture adhesion value at a stress value of 4 MPa of greater than 2,000 seconds in water at 90° C.

13. The moisture-curable adhesive of claim 1, wherein the adhesive, after curing, comprises a creep rupture adhesion value at a stress value of 4 MPa of greater than 500,000 seconds in water at 90° C.

14. The moisture-curable adhesive of claim 1, wherein the adhesive, after curing, comprises a creep rupture adhesion value in water at 90° C. of at least 50% of the value in air at 23° C.

15. The moisture-curable adhesive of claim 1, wherein the adhesive, after curing, comprises a creep rupture adhesion value in water at 90° C. of at least 70% of the value in air at 23° C.

16. The moisture-curable adhesive of claim 1, wherein the adhesive, after curing, comprises a creep rupture adhesion value in water at 90° C. of at least 90% of the value in air at 23° C.

17. The moisture-curable adhesive of claim 1, wherein the dimer is formed from $C_{14}$ to $C_{22}$ alkyl chains.

18. The moisture-curable adhesive of claim 1, wherein the polyol comprises a polyester.

19. The moisture-curable adhesive of claim 1, wherein the ratio of the at least one polyisocyanate and the at least one polyol is in the range from 20 to 80 wt. %:20 to 80 wt. %.

20. The moisture-curable adhesive of claim 1, wherein the NCO:OH molar ratio of the at least one polyisocyanate and the at least one polyester is in the range from 1.1:1 to 16:1.

21. The moisture-curable adhesive of claim 1, wherein the adhesive comprises from 14 to 30% by weight of dimer fatty acid.

22. The moisture-curable adhesive of claim 1, wherein the at least one polyester has an acid value less than 1.

23. The moisture-curable adhesive of claim 1, wherein the polyol component comprises at least one diol selected from ethylene glycol and propylene glycol.

* * * * *